(12) United States Patent
Garfinkle

(10) Patent No.: US 8,243,066 B2
(45) Date of Patent: Aug. 14, 2012

(54) SYSTEM AND METHOD FOR MODEL CREATION AND COMPUTER ANIMATION

(76) Inventor: Richard Garfinkle, Chicago, IL (US)

( * ) Notice: Subject to any disclaimer, the term of this patent is extended or adjusted under 35 U.S.C. 154(b) by 0 days.

(21) Appl. No.: 11/636,447

(22) Filed: Dec. 11, 2006

(65) Prior Publication Data

US 2008/0136812 A1    Jun. 12, 2008

(51) Int. Cl.
G06T 17/00    (2006.01)
G06T 15/00    (2006.01)

(52) U.S. Cl. ........................................ 345/420; 345/419
(58) Field of Classification Search .................. 345/419, 345/420, 473
See application file for complete search history.

(56) References Cited

U.S. PATENT DOCUMENTS

| | | | |
|---|---|---|---|
| 5,847,710 A | 12/1998 | Kroitor | |
| 5,945,996 A | 8/1999 | Migdal | |
| 6,037,949 A | 3/2000 | DeRose | |
| 6,369,815 B1* | 4/2002 | Celniker et al. | 345/420 |
| 6,529,192 B1 | 3/2003 | Waupotitsch | |
| 6,563,503 B1 | 5/2003 | Comair | |
| 6,611,267 B2 | 8/2003 | Migdal | |
| 6,614,428 B1 | 9/2003 | Lengyel | |
| 6,812,924 B2 | 11/2004 | Kondo | |
| 2002/0167518 A1 | 11/2002 | Migdal | |
| 2004/0075655 A1 | 4/2004 | Dunnett | |
| 2004/0183795 A1* | 9/2004 | Deering et al. | 345/419 |
| 2004/0189633 A1 | 9/2004 | Sederberg | |
| 2006/0013505 A1 | 1/2006 | Yau | |
| 2006/0120591 A1* | 6/2006 | Cathier et al. | 382/154 |
| 2006/0170688 A1* | 8/2006 | Ugail | 345/473 |

OTHER PUBLICATIONS

Grinspun, Eitan, "A discrete model of thin shells," Aug. 2005, International Conference on Computer Graphics and Interactive Techniques, ACM SIGGRAPH 2005 Courses, Article No. 4, pp. 1-8.*
Lihua You; Zhang, J.J., "Fast generation of 3-D deformable moving surfaces," Aug. 2003, Systems, Man, and Cybernetics, Part B, IEEE Transactions on , vol. 33, No. 4, pp. 616-625.*
Du, H. and Qin, H. 2005. Dynamic PDE-based surface design using geometric and physical constraints. Graph. Models 67, 1 (Jan. 2005), 43-71. DOI= http://dx.doi.org/10.1016/j.gmod.2004.06.002.*
Ugail, H., Bloor, M. I., and Wilson, M. J. 1999. Techniques for interactive design using the PDE method. ACM Trans. Graph. 18, 2 (Apr. 1999), 195-212. DOI= http://doi.acm.org/10.1145/318009.318078.*
A. Nasri, Curve interpolation in recursively generated B-spline surfaces over arbitrary topology, Computer Aided Geometric Design, vol. 14, Issue 1, Jan. 1997, pp. 13-30, ISSN 0167-8396, DOI:10.1016/S0167-8396(96)00018-0.*
Olivier Monga, Serge Benayoun, and Olivier D. Faugeras. Using Partial Derivatives of 3D Images to Extract Typical Surface Features. INRIA research report submitted to CVGIP: Image Understanding, 1992.*
Watt, Alan "3D Computer Graphics", 3rd Ed., Pub 1993 and 2000, Addison-Wesley Publishing Ltd., pp. 66-67 and 80-106.*

* cited by examiner

*Primary Examiner* — Daniel Hajnik
(74) *Attorney, Agent, or Firm* — Ted Sabety; Sabety + Associates PLLC

(57) ABSTRACT

A system and method for creating a three dimensional model of an object having a three dimensional shape is disclosed that includes first creating a mathematical function and the related numerical data which defines a three dimensional shape, and wherein the mathematical function and data creates a first patch which has a shape resembling the object, and the mathematical function is a differential geometric function. Next the function is processed to create a data set that defines an object model data set which is then stored in a memory.

31 Claims, 9 Drawing Sheets

SYSTEM AND METHOD FOR MODEL CREATION AND COMPUTER ANIMATION

BACKGROUND OF THE INVENTION

Conventional three dimensional computer animation relies on polygonal models, that is shapes which consist of a large set of triangles. Publications on this subject typically refer to these sets of triangles as a mesh or polygonal mesh. While there have been a number of inventions that bring to bear sophisticated mathematical processes in order to improve the quality of these polygonal meshes (see e.g. Kondo U.S. Pat. No. 6,812,924, Lengyel, U.S. Pat. No. 6,614,428 and Migdal et al. U.S. Pat. No. 6,611,267) the underlying concept of these inventions is to simulate a curved figure with straight lines. Realistic three dimensional animated models created using polygonal mesh technique require millions of operations in order to be drawn, and generally require large numbers of high powered computers as well as many man-hours of work to produce a single model. Even then, the models produced have a rigid, jagged quality. The limitations of this technique is the need to use a large number of very small straight lines in order to fool the eye into believing that it is seeing something that curves smoothly.

SUMMARY OF THE INVENTION

The present invention uses tools from the branch of mathematics known as differential geometry which, among its other applications, is used to analyze the curvature of shapes and to create mathematical functions approximating those shapes. These tools are elaborated in *Differential Geometry* by Michael Spivak (Publish or Perish Inc 1970). Spivak describes methods for the calculation of curves in Volume two, section 1 which is incorporated by reference herein, and describes methods for the calculation of surfaces in Volume two, sections 3A and 3B which are also incorporated by reference herein. In these sections, Spivak teaches the methods for determining the curvatures and vectors needed for patch creation. A patch is a three dimensional shape defined by a mathematical function and numerical data which defines the dimensions of said shape. To create a drawing according to the invention using differential geometry, a series of patches are created and then assembled using a drawing routine.

Accordingly, the present invention involves the application differential geometry such as that disclosed by Spivak in the field of computer drawing and computer animation. The present invention uses mathematical functions, either preprogrammed or user created, to create approximations of three dimensional geometric shapes of any desired degree of smoothness. For example a sphere can be generated using the function $f(r,t,p)=(r\cos(t)\sin(p), r\sin(t)\sin(p), r\cos(p))$. Using this method, drawings having highly sophisticated shapes may be crafted. These shapes, which make up the models, are drawn using hundreds or thousands of linear, quadratic, and cubic calculations according to a drawing routine. Each of these calculations is at most only slightly more demanding in computer processing time than the linear calculations made in standard systems, but because there are thousands instead of millions of these calculations, both the time necessary to complete a drawing and demands on the computer are reduced compared to conventional methods of three dimensional animation. In addition, the models created by the method described herein are stored in much smaller computer files, kilobytes in size rather than the multimegabyte files which characterized some of the prior art methods.

DETAILED DESCRIPTION

Figure 1:
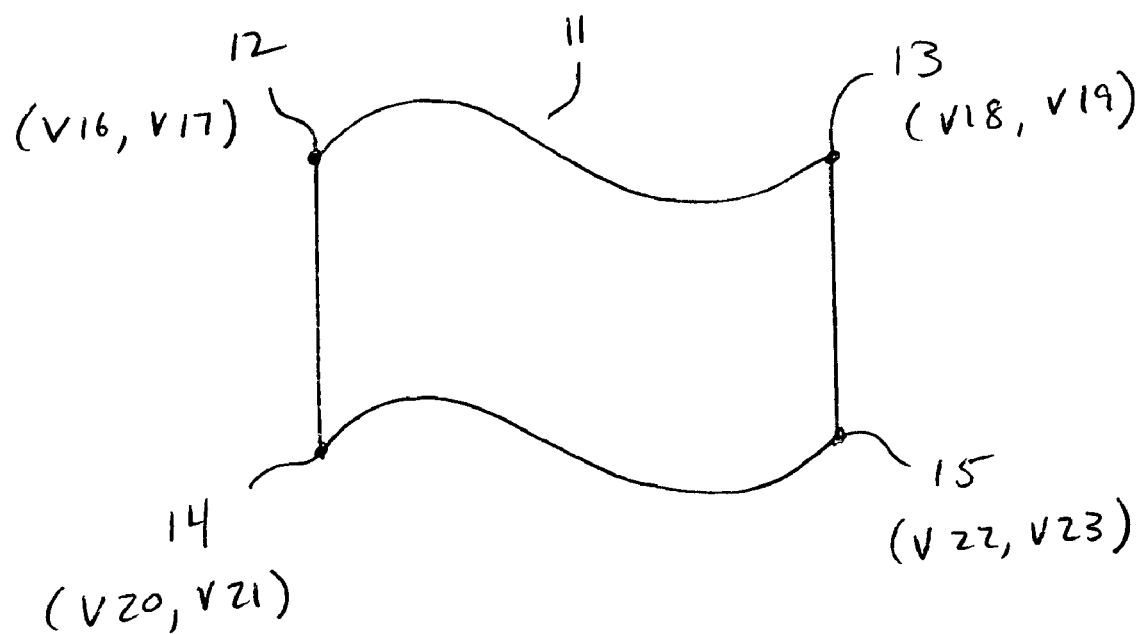
FIG. 1 is a schematic drawing illustrating a patch used in connection with animated drawing according to the invention.

Now referring to FIG. 1, according to the invention, for drawing purposes a stored function of any desired complexity is used to calculate four points in three dimensional space (point 12, point 13, point 14 and point 15) which define patch 11. Along with each of these points, two tangent vectors are determined (v16 and v17 for point 12; v18 and v19 for point 13, v20 and v21 for point 14; and v22 and v23 for point 15) using methods from differential calculus. Other values that determine how the curve bends between points (the so-called "principal curvatures") are also calculated. This produces the data necessary to draw the patch 11. The points and vectors for each corner (point 12, point 13, point 14, and point 15) of the patch are then stored together.

Figure 2A:
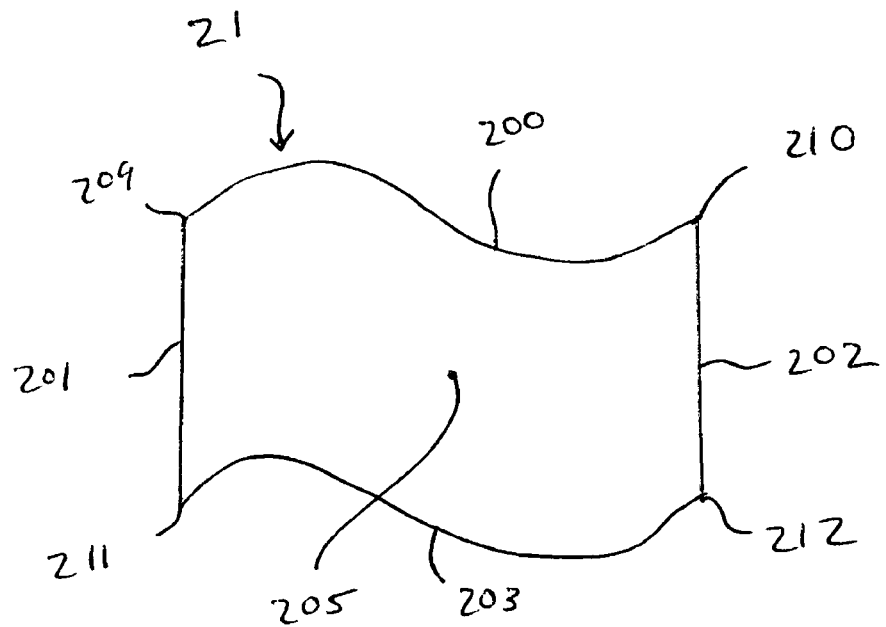
FIG. 2a is a schematic representation of a second patch.
Figure 2B:
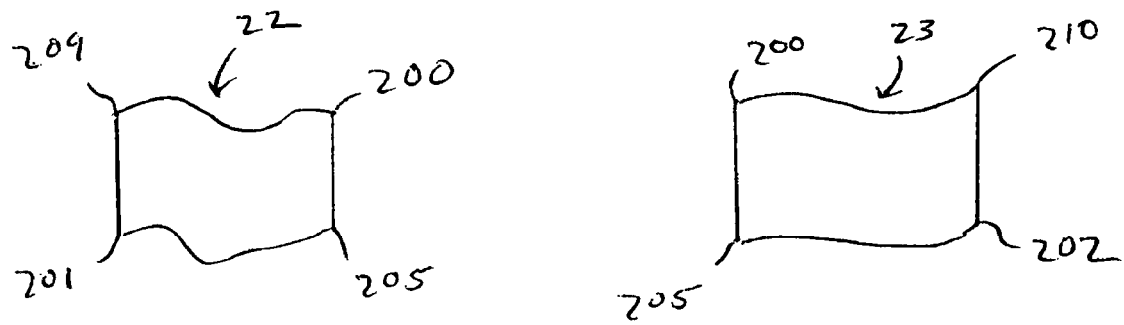
FIG. 2b is a schematic representation of the second patch broken into four component sub-patches.
Figure 2B:
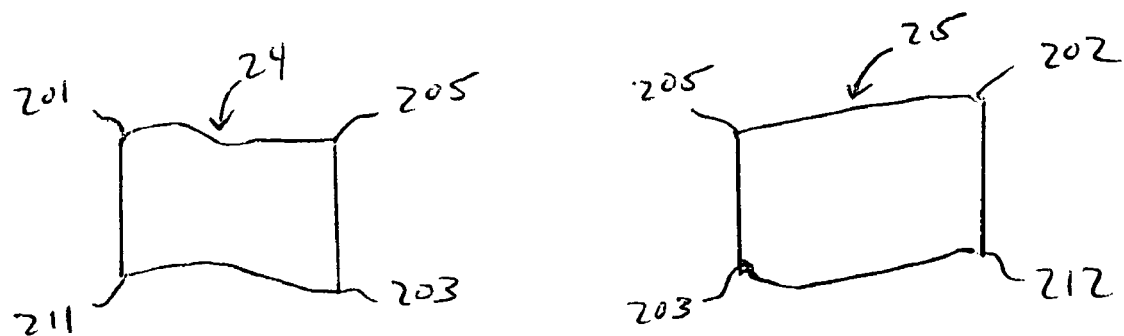

FIG. 2 illustrates the ability of this method to create desired levels of detail in a drawing. For example, if patch 21 is found to be too large for its desired resolution, the center point of the patch and the center points of the edges can be calculated and the patch 21 may be broken up into four sub-patches 22, 23, 24, 25 as depicted in FIG. 2b. In this example, sub-patch 22 is defined by point 201, center top point 200, center point 205, center left point 201. This process of creating sub-patches can be repeated as often as necessary by successively subdividing the resulting sub-patches. Using this technique, new levels of detail can be created as needed in the drawing process. While some objects may require high resolution, small objects or an objects seen from a distance in the drawing will not need to be broken up as many times as close up or large objects.

Figure 3:
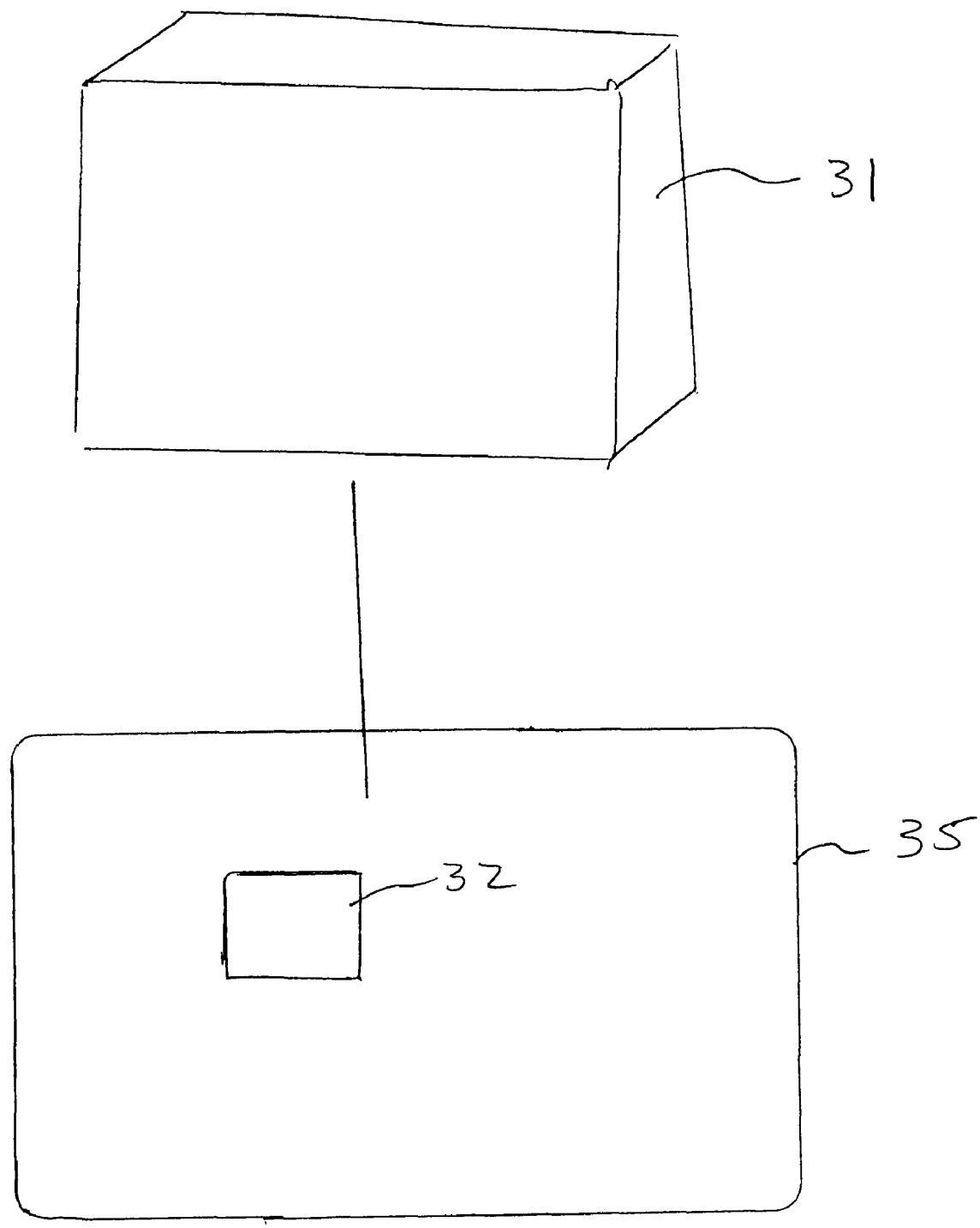
FIG. 3 is a schematic representation of a projection image of a patch.

FIG. 3 illustrates the process in which the optical characteristics of a preselected shape that has been created are stored as mathematical functions together with numerical data to be used at any desired point in the drawing process. Patch 31 representing the data for a three dimensional patch is projected onto a two dimensional rectangle 35 representing either the screen of the computer or a frame in a video being rendered producing a patch 32 on a display screen. This method uses this process in two different ways as described herein in conjunction with the explanation of FIG. 4.

Figure 4:
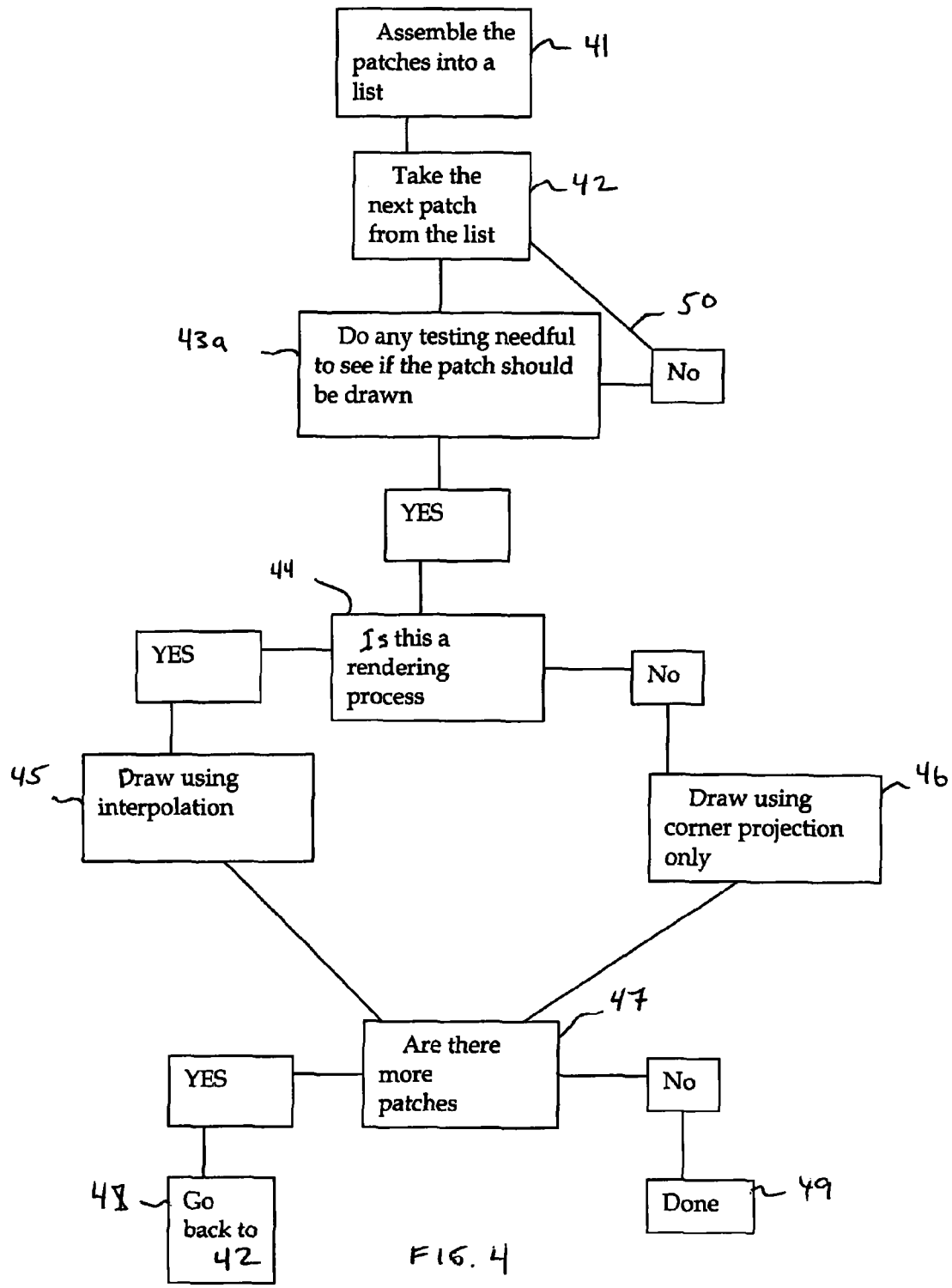
FIG. 4 is a flow chart demonstrating the steps used in a patch by patch drawing process.

FIG. 4 depicts a flow chart for the patch by patch drawing process according to the invention. Now referring to reference numeral 41 a first step where a list of patches that has been created is arranged into a list that is used in a particular drawing assembly operation or drawing routine. This assembly operation can optionally include various tests for visibility such as determining whether the patch can be seen from a selected viewpoint. The list can also optionally be sorted so that the patches closest to the camera are first drawn by the software drawing routine.

In step 42, a patch is selected from the patch list that approximates the shape of the object shape.

Next, in step 43a, a determination whether any further testing for visibility is done. For example, the patch may be tested to see if it is blocked by a previously drawn patch. If the patch is blocked and does not have be drawn, the process proceeds back to step 42 via route 50. If the patch will be drawn, the method proceeds to step 44.

In step 44 the drawing processes is performed depending on whether or not this is a rendering for final video output or simply a screen view in the animation software.

If the patch is not for a rendering process, in step 46 each patch in the patch list is successively drawn as follows: First, the corners of a patch may be projected and their tangent vectors projected in order to generate the information needed for presently available two dimensional drawing software to create a projected image of the patch, thus quickly creating a patchy view of the stored shape. This image is then used by the animator to create and shape the model since the animator cannot get a good idea of what the object will look like using this method of approximation.

If the patch is for a rendering process, in step 46 a rendering process that is used to create final video products uses the patch differently. It takes the values at the corners and, using a mathematical process called interpolation, calculates each point within the patch without reference to the initial function. These interpolations are quick, simple calculations, and because the patch is already sized to the desired resolution, the computer will do no more or less work than is actually needed to produce the desired image.

Next, in step 47, a determination is made if there are more patches required to approximate the shape of the object shape. If more patches are required the process is repeated from step 42. If no further patches are required, the process is complete.

Figure 5:
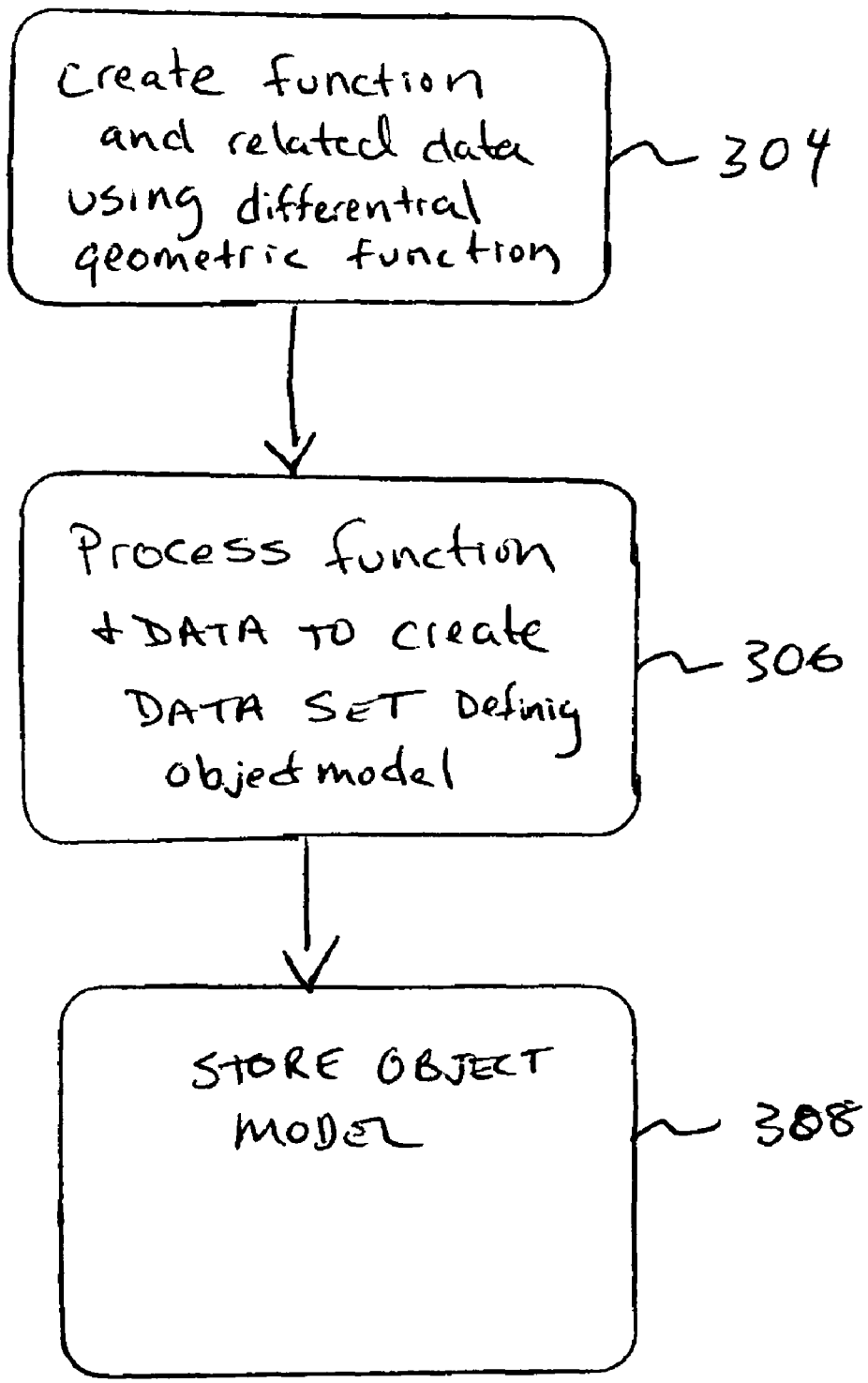
FIG. 5 is a flow chart demonstrating the method of the invention.

FIG. 5 depicts a flow chart demonstrating the method of the invention including step 304 wherein a first mathematical function and related numerical data for the generation of a three dimensional shape is created, wherein the mathematical function and data creates a patch and the patch is a shape resembling the object, and wherein said mathematical function is a differential geometric function. Next in step 306 the function is processed using the data to create a data set that defines an object model data set. Next, in step 308, the object model data set is stored, wherein the object model data set defines the object model.

Figure 6:
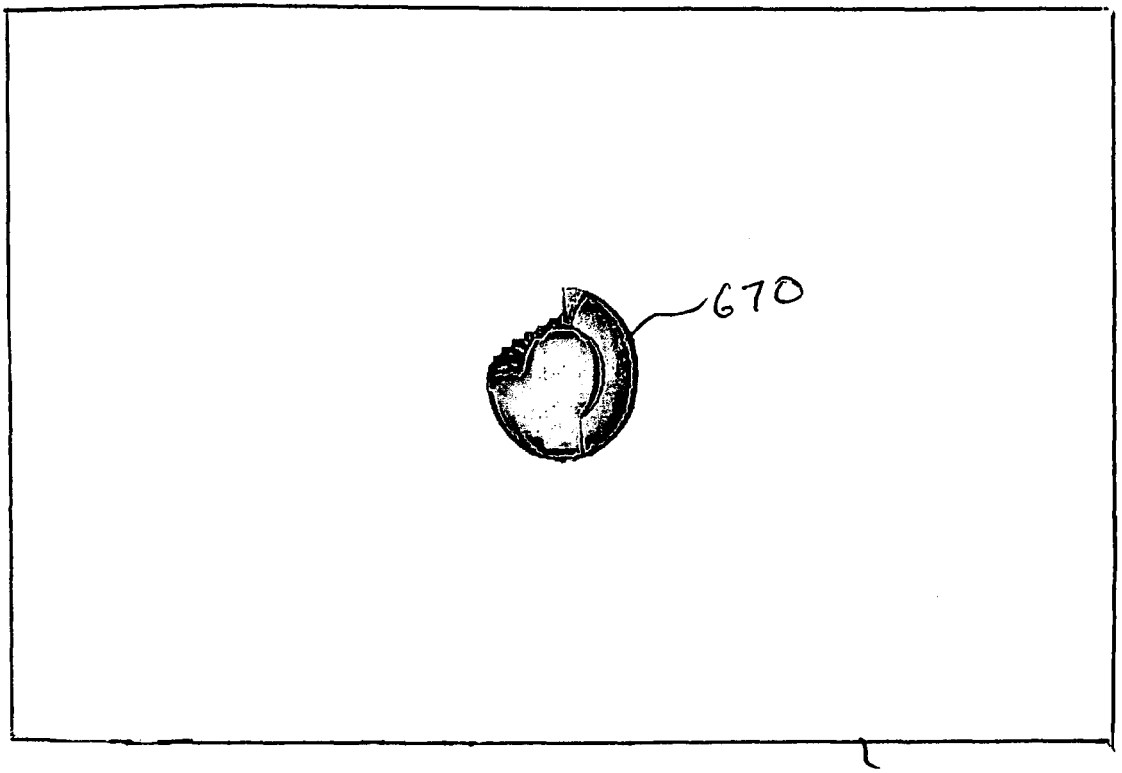
FIG. 6 is a display or screen shot of a first model created using the method disclosed herein.

Now referring to FIG. 6, a printed output from a working versions of the first embodiment of the invention, that depicts a shape 670 drawn from the pre-selected patches according to the drawing process of the invention is shown on display screen 672. In this example, the patch process is set to a low resolution. This figure illustrates a shape drawn from a set of patches.

Figure 7:
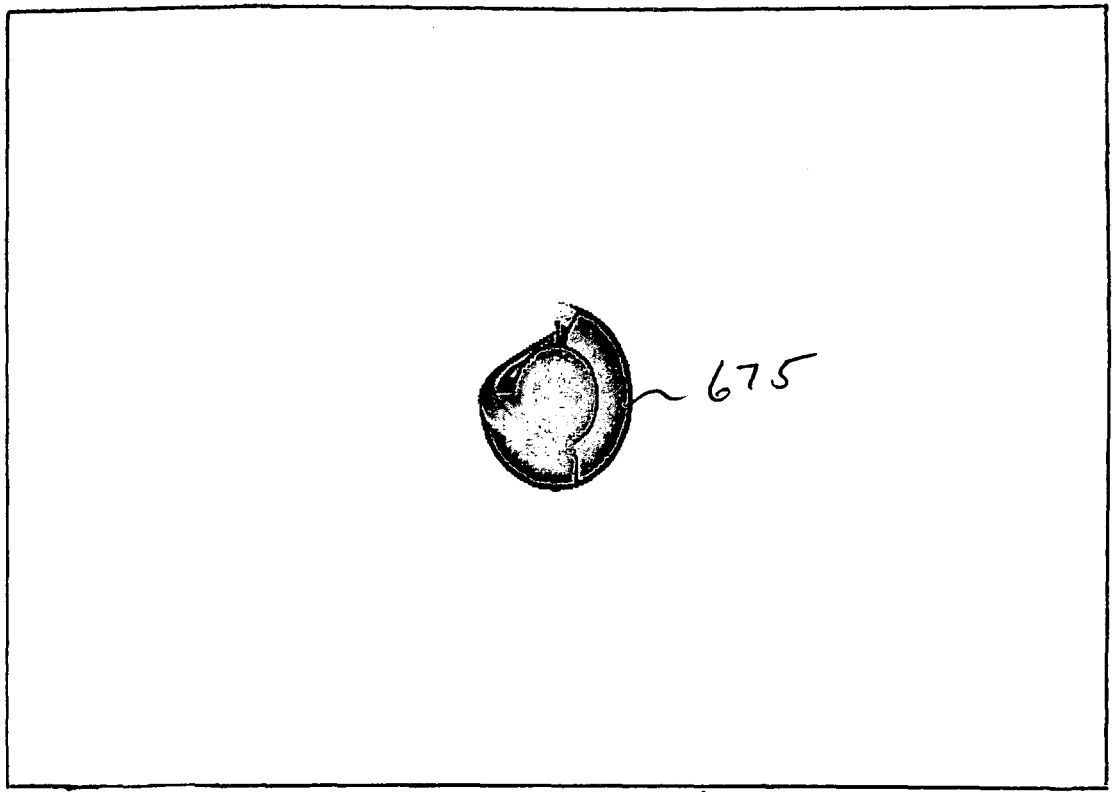
FIG. 7 is a display or screen shot of a second model created using the method disclosed herein.

FIG. 7 shows the similar shape 675 as shown in as in FIG. 6 on display screen 680, but with the patch process set to a higher resolution which produces a larger number of smaller patches, creating a much smoother drawing; the curvature of the shape is emphasized here.

A preferred embodiment of this invention is a software package for animators implemented on a computer or other microprocessing devices enabling the creation of models which can then be animated and rendered into standard video files for play on any video capable playback device (such as a DVD player).

The following examples are segments of code from software which has been developed to perform the predrawing process of an embodiment of the invention. In this embodiment, the language used in the Examples is Objective-C under the Macintosh Operating System.

The first segment as set forth below in Example 1 is illustrative of the storage of preselected functions in the program. Specifically, it is the declaration for a sine function, and the code used to calculate the value of that function at a set of parameters (the parameters are stored in objects called numerical_operands).

EXAMPLE 1

```
@interface sine_operand: operand {
    float amplitude, frequency, phase_shift;
    operand *base_operand;
}
+(id)get_sub_components;
-(id)init;
-(id)initWithCoder:(NSCoder *)coder;
-(void)encodeWithCoder:(NSCoder *)coder;
-(id)init_from_base:(operand *)nb;
-(id)init_from_base:(operand *)nb amplitude:(float)namp
    frequency:(float)freq phase_shift:(float)nps;
-(id)init_from_base:(operand *)nb amplitude:(float)namp
    wave_length:(float)wl phase_shift:(float)nps;
-(id)make_copy;
-(void)set_amplitude:(float)namp;
-(void)set_frequency:(float)freq;
-(void)set_phase_shift:(float)nps;
-(void)set_wave_length:(float)wl;
-(float)get_amplitude;
-(float)get_frequency;
-(float)get_wave_length;
-(float)get_phase_shift;
-(void)set_base:(operand *)nb;
-(float)component_value:(int)which;
-(operand *)get_base;
-(float)eval_at:(numerical_operand *)valuation;
-(NSString *)get_name;
-(NSString *)get_shape_entry_name;
@end
```

EXAMPLE 1A

The following code segment is the implementation of the eval_at: method which is used to find the value of the sine_operand function.

```
-(float)eval_at:(numerical_operand *)valuation
(if (valuation == nil)
    return 0.0;
    if (base_operand == nil)
        return amplitude * sin(frequency * [valuation get_nth_value:1]
            + phase_shift);
    return amplitude * sin(frequency * [base_operand eval_at:valuation]
        + phase_shift);
}
```

EXAMPLE 2

The following code segment is the declaration of a standard surface object used to store the functions that can be used to draw a surface.

```
@interface surface_operand : geometric_operand {
    operand *coord_operands[3];
}
+(id)get_sub_components;
-(id)init;
-(id)initWithCoder:(NSCoder *)coder;
-(void)encodeWithCoder:(NSCoder *)coder;
-(id)init_from_coord_operands_x:(operand *)x y:(operand *)y
    z:(operand *) z;
-(id)make_copy;
-(int)num_dimensions:(BOOL) second;
-(void)set_x_component:(operand *)new_op;
-(void)set_y_component:(operand *)new_op;
-(void)set_z_component:(operand *)new_op;
-(void)set_coord_operand:(operand *)new_op which:(int)which;
-(operand *)get_coord_operand:(int)which;
-(operand *)get_x_component;
-(operand *)get_y_component;
-(operand *)get_z_component;
-(id)get_location_at:(numerical_operand *)valuation;
-(id)point_at:(numerical_operand *)valuation;
-(id)get_tangent_vector_at:(numerical_operand *)valuation
which:(int)w;
-(id)get_second_deriv_vector_at:(numerical_operand *)valuation
    which:(int)w;
-(id)get_normal_vector_at:(numerical_operand *)valuation;
-(NSString *)get_name;
-(NSString *)get_shape_entry_name;
@end
```

The next code segment shows the point_at: method for the surface which is used to calculate a three dimensional point of the surface for a given set of parameters

```
-(id)point_at: (numerical_operand *)valuation
{float x = 0.0, y = 0.0, z = 0.0;
    if (coord_operands[0] != nil)
        x = [coord_operands[0] eval_at:valuation];
    if (coord_operands[1] != nil)
        y = [coord_operands[1] eval_at:valuation];
    if (coord_operands[2] != nil)
        z = [coord_operands[2] eval_at:valuation];
    return [[NSClassFromString(@"Three_D_Point") alloc]
        init_from_coords_x:x y:y z:z]; }
```

The following sets of code shows the declarations needed to construct a two dimensional patch. The first object "infinitesmall_surface" represents a corner of the patch, surface_trace_square and square_traced_area represent patches, the latter also contains parameter information

```
@interface infinitesmal_surface :geometric_operand {
        id location, real_location; //Three_D_Point
        id tangents0, tangents1, second_derivs0, second_derivs1, normal;
        id params;
}
+(id)get_sub_components;
-(id)init;
-(id)init_empty;
-(id)initWithCoder:(NSCoder *)coder;
-(void)encodeWithCoder:(NSCoder *)coder;
-(id)init_from_surface:(id )surf parameters:(numerical_operand
    *)valuation;
-(id)init_tangentless_from_surface:(id )surf
    parameters:(numerical_operand *)valuation;
-(id)old_init_from_surface:(id )surf parameters:(numerical_operand
    *)valuation;
-(id)init_from_surface:(id )surf parameters:(numerical_operand
    *)valuation in_box:(id)used_box;
-(void)set_from_surface:(id )surf parameters:(numerical_operand
    *)valuation;
-(void)calculate_from_surface_and_parameters:(id )surf
    parameters:(numerical_operand * )valuation;
-(void)set_location:(id) new_loc;
-(void)set_real_location:(id)new_location;
-(void)set_tangent:(id )new_vector which:(int)which;
-(void)set_second_derivs:(id )new_vector which:(int)which;
-(void)set_normal:(id )new_vector;
-(void)recalculate_normal;
-(void)calculate_second_derivatives_from_surf:(id)surf;
-(void)calculate_tangents_from_surf:(id)surf;
-(id)get_location;
-(id)get_real_location;
-(id )get_tangent_vector:(int)which;
-(void)set_tangent0:(id )new_vector;
-(void)set_tangent1:(id )new_vector;
-(id )get_tangent_vector0;
-(id )get_tangent_vector1;
-(id )get_second_derivs:(int)which;
-(id)get_normal;
-(id)calculate_location_from_s:(float)s t:(float)t;
-(id)calculate_location_at:(numerical_operand *)valuation;
-(float)distance_to_POV:(id)this_POV;
-(float)distance_to_point:(id)used_point;
-(void)clean_self;
-(id)make_copy;
-(int)num_dimensions:(BOOL)second;
-(NSString *)get_name;
-(NSString *)get_shape_entry_name;
-(id)get_params;
@end
@interface surface_trace_square:operand {
        infinitesmal_surface *corners[2] [2]; //00 = UL 01 = UR 10 = LL 11
            == LR
}
-(id)init;
-(id)initWithCoder:(NSCoder *)coder;
-(void)encodeWithCoder:(NSCoder *)coder;
-(id)init_from_infinitesmal_surfaces_UL:(infinitesmal_surface *)UL
    UR:(infinitesmal_surface *)UR LL:(infinitesmal_surface *)LL
    LR:(infinitesmal_surface *)LR;
-(void)set_corner_UL:(BOOL)lower LR:(BOOL)right
    to:(infinitesmal_surface *)new_surface;
-(void)set_corners_UL:(infinitesmal_surface *)UL
    UR:(infinitesmal_surface *)UR LL:(infinitesmal_surface *)LL
    LR:(infinitesmal_surface *)LR;
-(void)shift_left_right:(BOOL)right s1:(infinitesmal_surface *)new_s1
    s2:(infinitesmal_surface *)new_s2;
-(void)shift_up_down:(BOOL)lower s1:(infinitesmal_surface *)new_s1
    s2:(infinitesmal_surface *)new_s2;
-(infinitesmal_surface *)get_corner_UL:(BOOL)lower
LR:(BOOL)right;
-(infinitesmal_surface *)interpolate_square:(int)which_square
    s:(float)s t:(float)t;
-(infinitesmal_surface *)get_corner_UL;
-(infinitesmal_surface *)get_corner_UR;
-(infinitesmal_surface *)get_corner_LL;
-(infinitesmal_surface *)get_corner_LR;
-(void)set_corner_UL:(id)new_corner;
-(void)set_corner_UR:(id)new_corner;
-(void)set_corner_LL:(id)new_corner;
-(void)set_corner_LR:(id)new_corner;
-(float)get_top_length;
-(float)get_bottom_length;
-(float)get_left_length;
-(float)get_right_length;
-(float)distance_to_POV:(id)this_POV;
-(void)clean_self;
-(int)num_dimensions:(BOOL)second;
@end
@interface square_traced_area :surface_trace_square {
        id base_operand;
        float vertical_low, vertical_high, horizontal_low, horizontal_high,
            diameter;
}
+(id)get_sub_components;
-(id)init;
-(id)init_empty;
-(id)initWithCoder:(NSCoder *)coder;
-(void)encodeWithCoder:(NSCoder *)coder;
-(id)init_from_infinitesmal_surfaces_UL:(infinitesmal_surface *)UL
```

```
        UR:(infinitesmal_surface *)UR LL:(infinitesmal_surface *)LL
        LR:(infinitesmal_surface *)LR;
-(void)set_corner_UL:(BOOL)lower LR:(BOOL)right
        to:(infinitesmal_surface *)new_surface;
-(void)set_corners_UL:(infinitesmal_surface *)UL
        UR:(infinitesmal_surface *)UR LL:(infinitesmal_surface *)LL
        LR:(infinitesmal_surface *)LR;
-(id)init_from_surface:(id )new_base vl:(float)vl vh:(float)vh
        hl:(float)hl hh:(float)hh;
-(id)init_from_surface:(id )new_base vl:(float)vl vh:(float)vh
        hl:(float)hl hh:(float)hh in_box:(id)used_box;
-(void)set_from_surface:(id)new_base vl:(float)vl vh:(float)vh
        hl:(float)hl hh:(float)hh;
-(void)set_base_operand:(operand *)new_base;
-(void)set_vertical_range_vl:(float)vl vh:(float)vh;
-(void)set_horizontal_range_hl:(float)hl hh:(float)hh;
-(id )get_base_operand;
-(float)get_vertical_low;
-(float)get_vertical_high;
-(float)get_horizontal_low;
-(float)get_horizontal_high;
-(void)recalculate_square;
-(float)calculate_diameter;
-(float)get_diameter;
-(id)get_normal_at:(numerical_operand *)valuation;
-(infinitesmal_surface *)get_corner_UL;
-(infinitesmal_surface *)get_corner_UR;
-(infinitesmal_surface *)get_corner_LL;
-(infinitesmal_surface *)get_corner_LR;
-(NSRect)occupation_rect_for_POV:(id)this_POV;
-(NSRect)minimal_occupation_rect_for_POV:(id)this_POV;
-(BOOL)intersects_rect:(NSRect)this_rect for_POV:(id)this_POV
        x_offset:(float)x_o y_offset:(float)y_o;
-(BOOL)intersects_rect:(NSRect)this_rect for_POV:(id)this_POV
        center:(NSPoint)base_point scaling:(float)scaling
        flip_scaling:(float)flip_scaling compass:(id)shifting_compass
        scale_factor:(float)sf;
-(id)calculate_location_from_s:(float)s t:(float)t;
-(float)shading_from_POV:(id)this_POV at_s:(float)s t:(float)t;
-(void)rescale_parameters:(numerical_operand *)valuation;
-(int)num_dimensions:(BOOL)second;
-(void)clean_self;
-(id)make_copy;
-(void)calculate_second_derivatives;
-(void)calculate_tangents;
-(void)drawing_array_for_viewer:(id)this_viewer POV:(id)this_POV
        viewing_area:(NSRect)this_rect center:(NSPoint)base_point
        scaling:(float)scaling flip_scaling:(float)flip_scaling
        tolerance:(float)tolerance coloring:(id)coloring
        compass:(id)shifting_compass compass_rot:(id)compass_rot
        neg_normal:(id)neg_normal base_res:(float)base_res
        scale_factor:(float)sf small:(BOOL)small_draw;
-(void)drawing_array_for_viewer:(id)this_viewer POV:(id)this_POV
        viewing_area:(NSRect)this_rect center:(NSPoint)base_point
        scaling:(float)scaling flip_scaling:(float)flip_scaling
        tolerance:(float)tolerance coloring:(id)coloring
        compass:(id)shifting_compass compass_rot:(id)compass_rot
        neg_normal:(id)neg_normal base_res:(float)base_res
        scale_factor:(float)sf style:(id)this_style;
@end
```

The three_D_Point and vector_operand objects referred to above are simply ways of storing the information needed for a point and a vector respectively.

EXAMPLE 3

The following sequence is a procedure for filling an infinitesmal_surface's components (location, tangent0, tangent1, normal) with the calculated values from any shape (DIFFER is a small number commonly 0.0001 OODIFFER is 1/DIFFER)

```
-(void)generate_2D_patch_values_from:(numerical_operand
    *)valuation
    into_location:(id)patch_point tangent0:(id)patch_tangent0
    tangent1:(id)patch_tangent1 normal:(id)patch_normal
{id p1;
    float x1, y1, z1, x2, y2, z2, dx, dy, dz, temp;
    BOOL dummy;
    if (valuation != nil)
    {   p1 = [self point_at:valuation];
        [patch_point copy_from:p1 up_to:3];
        x1 = [patch_point get_nth_value:1];
        y1 = [patch_point get_nth_value:2];
        z1 = [patch_point get_nth_value:3];
        temp = [valuation get_nth_value:1];
        [valuation set_nth_value:1 to:(temp + DIFFER)];
        p1 = [self point_at:valuation];
        x2 = [p1 get_nth_value:1];
        y2 = [p1 get_nth_value:2];
        z2 = [p1 get_nth_value:3];
        dx = (x2 − x1) * OODIFFER;
        dy = (y2 − y1) * OODIFFER;
        dz = (z2 − z1) * OODIFFER;
        [patch_tangent0 set_rectangular_x:dx y:dy z:dz];
        [valuation set_nth_value:1 to:temp];
        temp = [valuation get_nth_value:2];
        [valuation set_nth_value:2 to:(temp + DIFFER)];
        p1 = [self point_at:valuation];
        x2 = [p1 get_nth_value:1];
        y2 = [p1 get_nth_value:2];
        z2 = [p1 get_nth_value:3];
        dx = (x2 − x1) * OODIFFER;
        dy = (y2 − y1) * OODIFFER;
        dz = (z2 − z1) * OODIFFER;
        [patch_tangent1 set_rectangular_x:dx y:dy z:dz];
        [valuation set_nth_value:2 to:temp];
        dummy = [patch_tangent0 normalize];
        dummy = [patch_tangent1 normalize];
        [patch_normal set_equal_to_cross_product_of:patch_tangent0
            with:patch_tangent1];
    }
}
```

EXAMPLE 4

The following procedure takes the predrawings data stored in an object called block_space data and stores it into a square_traced_area, giving the square_traced_area all the data it needs to be a patch.

```
-(BOOL)store_into_infinitesmal_square:(id)this_infinitesmal_square
    second_derivs:(BOOL)YN valuation_holder:(id)valuation
{id base_object;
    id pre_valuation;
    id next_victim;
    id copy_target;
    id this_infinitesmal;
    id patch_point, patch_tangent0, patch_tangent1, patch_normal;
    if ([used_data count] < 2)
        return NO;
    base_object = [used_data objectAtIndex:0];
    pre_valuation = [used_data objectAtIndex:1]; //1 = hl 2 = hh 3 = vl
        4 = vh
    if (![valuation
        isKindOfClass:NSClassFromString(@"numerical_operand")])
        return NO;
    if ([base_object
        isKindOfClass:NSClassFromString(@"governor_tree")])
        base_object = [base_object get_operand];
    if ([base_object
        isKindOfClass:NSClassFromString(@"governor_operand")])
        base_object = [base_object what_are_you];
    if ([base_object
        isKindOfClass:NSClassFromString(@"animation_object")])
        base_object = [base_object get_shape];
```

```
if ([base_object
    isKindOfClass:NSClassFromString(@"anchor_operand")])
    base_object = [base_object get_base_operand];
if (![base_object
    isKindOfClass:NSClassFromString(@"geometric_operand")])
    return NO;
[this_infinitesmal_square set_vertical_range_vl:[pre_valuation
    get_nth_value:3] vh:[pre_valuation get_nth_value:4]];
[this_infinitesmal_square set_horizontal_range_hl:[pre_valuation
    get_nth_value:1] hh:[pre_valuation get_nth_value:2]];
this_infinitesmal = [this_infinitesmal_square get_corner_UL];
[valuation set_nth_value:1 to:[pre_valuation get_nth_value:1]];
[valuation set_nth_value:2 to:[pre_valuation get_nth_value:3]];
[[this_infinitesmal get_params] copy_from:valuation up_to:3];
patch_point = [this_infinitesmal get_location];
patch_tangent0 = [this_infinitesmal get_tangent_vector0];
patch_tangent1 = [this_infinitesmal get_tangent_vector1];
patch_normal = [this_infinitesmal get_normal];
if (patch_normal == nil)
{ patch_normal = [[NSClassFromString(@"vector_operand") alloc]
    init];
    [this_infinitesmal set_normal:patch_normal];}
[base_object generate_2D_patch_values_from:valuation
    into_location:patch_point tangent0:patch_tangent0
    tangent1:patch_tangent1 normal:patch_normal];
[[this_infinitesmal get_real_location] copy_from:patch_point
    up_to:3];
if (YN) {
    next_victim = [base_object get_second_deriv_vector_at:valuation
        which:1];
    copy_target = [this_infinitesmal get_second_derivs:1];
    if (copy_target == nil)
        [this_infinitesmal set_second_derivs:next_victim which:1];
    else
    }
    [copy_target copy_from_vector:next_victim];
    [next_victim autorelease];
    }
    next_victim = [base_object get_second_deriv_vector_at:valuation
        which:2];
    copy_target = [this_infinitesmal get_second_derivs:2];
    if (copy_target == nil)
        [this_infinitesmal set_second_derivs:next_victim which:2];
    else
    {
        [copy_target copy_from_vector:next_victim];
        [next_victim autorelease];
    }
}
this_infinitesmal = [this_infinitesmal_square get_corner_UR];
[valuation set_nth_value:1 to:[pre_valuation get_nth_value:2]];
[[this_infinitesmal get_params] copy_from:valuation up_to:3];
patch_point = [this_infinitesmal get_location];
patch_tangent0 = [this_infinitesmal get_tangent_vector0];
patch_tangent1 = [this_infinitesmal get_tangent_vector1];
patch_normal = [this_infinitesmal get_normal];
if (patch_normal == nil)
{ patch_normal = [[NSClassFromString(@"vector_operand") alloc]
    init];
    [this_infinitesmal set_normal:patch_normal];}
[base_object generate_2D_patch_values_from:valuation
    into_location:patch_point tangent0:patch_tangent0
    tangent1:patch_tangent1 normal:patch_normal];
[[this_infinitesmal get_real_location] copy_from:patch_point
    up_to:3];
if (YN) {
    next_victim = [base_object get_second_deriv_vector_at:valuation
        which:1];
    copy_target = [this_infinitesmal get_second_derivs:1];
    if (copy_target == nil)
        [this_infinitesmal set_second_derivs:next_victim which:1];
    else
    {
        [copy_target copy_from_vector:next_victim];
        [next_victim autorelease];
    }
    next_victim = [base_object get_second_deriv_vector_at:valuation
        which:2];
    copy_target = [this_infinitesmal get_second_derivs:2];
    if (copy_target == nil)
        [this_infinitesmal set_second_derivs:next_victim which:2];
        else
        {
            [copy_target copy_from_vector:next_victim];
            [next_victim autorelease];
        }
}
this_infinitesmal = [this_infinitesmal_square get_corner_LR];
[valuation set_nth_value:2 to:[pre_valuation get_nth_value:4]];
[[this_infinitesmal get_params] copy_from:valuation up_to:3];
patch_point = [this_infinitesmal get_location];
patch_tangent0 = [this_infinitesmal get_tangent_vector0];
patch_tangent1 = [this_infinitesmal get_tangent_vector1];
patch_normal = [this_infinitesmal get_normal];
if (patch_normal == nil)
{ patch_normal = [[NSClassFromString(@"vector_operand") alloc]
    init];
    [this_infinitesmal set_normal:patch_normal];}
[base_object generate_2D_patch_values_from:valuation
    into_location:patch_point tangent0:patch_tangent0
    tangent1:patch_tangent1 normal:patch_normal];
[[this_infinitesmal get_real_location] copy_from:patch_point
    up_to:3];
if (YN) {
    next_victim = [base_object get_second_deriv_vector_at:valuation
        which:1];
    copy_target = [this_infinitesmal get_second_derivs:1];
    if (copy_target == nil)
        [this_infinitesmal set_second_derivs:next_victim which:1];
    else
    {
        [copy_target copy_from_vector:next_victim];
        [next_victim autorelease];
    }
    next_victim = [base_object get_second_deriv_vector_at:valuation
        which:2];
    copy_target = [this_infinitesmal get_second_derivs:2];
    if (copy_target == nil)
        [this_infinitesmal set_second_derivs:next_victim which:2];
    else
    {
        [copy_target copy_from_vector:next_victim];
        [next_victim autorelease];
    }
}
this_infinitesmal = [this_infinitesmal_square get_corner_LL];
[valuation set_nth_value:1 to:[pre_valuation get_nth_value:1]];
[[this_infinitesmal get_params] copy_from:valuation up_to:3];
patch_point = [this_infinitesmal get_location];
patch_tangent0 = [this_infinitesmal get_tangent_vector0];
patch_tangent1 = [this_infinitesmal get_tangent_vector1];
patch_normal = [this_infinitesmal get_normal];
if (patch_normal == nil)
{ patch_normal = [[NSClassFromString(@"vector_operand") alloc]
    init];
    [this_infinitesmal set_normal:patch_normal];}
[base_object generate_2D_patch_values_from:valuation
    into_location:patch_point tangent0:patch_tangent0
    tangent1:patch_tangent1 normal:patch_normal];
[[this_infinitesmal get_real_location] copy_from:patch_point
    up_to:3];
if (YN) {
    next_victim = [base_object get_second_deriv_vector_at:valuation
        which:1];
    copy_target = [this_infinitesmal get_second_derivs:1];
    if (copy_target == nil)
        [this_infinitesmal set_second_derivs:next_victim which:1];
    else
    {
        [copy_target copy_from_vector:next_victim];
        [next_victim autorelease];
    }
    next_victim = [base_object get_second_deriv_vector_at:valuation
        which:2];
    copy_target = [this_infinitesmal get_second_derivs:2];
    if (copy_target == nil)
        [this_infinitesmal set_second_derivs:next_victim which:2];
    else
    {
        [copy_target copy_from_vector:next_victim];
```

```
    [next_victim autorelease];
    }
  }
  return YES;
}
```

EXAMPLE 5

The following procedure generates the bezierpaths and colors needed to draw a patch. The compasses referred to contain position and rotation information that place the shape being drawn in three dimensional space. The POV referred to herein represents the point of view in space where the object is being viewed from. The projection_to_POV: does standard projection of a three dimensional point to the two dimensional plane at the location of the POV and perpendicular to its direction of view.

```
-(void) create_drawing_array_for_viewer:(id)this_viewer POV:(id)this_POV
    viewing_area:(NSRect)this_rect center:(NSPoint)base_point
    scaling:(float)scaling flip_scaling:(float)flip_scaling
    coloring:(id)coloring compass:(id)shifting_compass
    compass_rot:(id)compass_rot neg_normal:(id)neg_normal
    base_res:(float)base_res scale_factor:(float)sf
    using_infinitesmal_square:(id)target_square
    valuation_holder:(id)valuation drawn_list:(id)drawn_list
{NSPoint aPoint, oldAPoint, controlPoint1, controlPoint2;
    NSRect test_rect;
    id p1, p2, p3, p4, p5, p6, target_surface1, target_surface2;
    id shaded_color;
    id drawing_dummy, vector1, vector2, vector3, vector4, vector5,
        vector6, vector_test, color_valuation;
    id point_dummy, old_point_dummy;
    id tool_POV = this_POV;
    id new_victim;
    id drawn_space;
    int i,c;
    BOOL draw_test, do_draw_this;
    float used_d, shading, temp_usage, temp_d;
    c = [used_data count];
    if (c > 2)
    {for (i = 2; i < c; i++)
    {new_victim = [used_data objectAtIndex:i];
        if ([new_victim
            isKindOfClass:NSClassFromString(@"block_space_data")])
        {if ([new_victim count] > 1)
            [new_victim create_drawing_array_for_viewer:this_viewer
                POV:this_POV viewing_area:this_rect center:base_point
                scaling:scaling flip_scaling:flip_scaling
                coloring:(id)coloring compass:shifting_compass
                compass_rot:compass_rot neg_normal:neg_normal
                base_res:base_res scale_factor:sf
                using_infinitesmal_square:target_square
                valuation_holder:valuation drawn_list:drawn_list];
        }
    }
    }
    else
    {if (drawn_list == nil)
        draw_test = YES;
        else
        {
        drawn_space = [drawn_list get_base_operand];
        if (drawn_space == nil)
            draw_test = YES;
        else
        {test_rect = [self occupation_rect_for_POV:this_POV];
            draw_test = ![drawn_space
                blocks_rect:used_occupation_rect];}
        }
        if (draw_test)
        {
        draw_test = [self store_into_infinitesmal_square:target_square
            second_derivs:NO valuation_holder:valuation];
        if (draw_test)
        {
    color_valuation = [[numerical_block2 alloc] init];
    drawing_dummy = [NSBezierPath bezierPath];
    p1 = [[NSClassFromString(@"Three_D_Point") alloc] init];
    point_dummy = [[NSClassFromString(@"Three_D_Point") alloc] init];
    old_point_dummy = [[NSClassFromString(@"Three_D_Point") alloc]
        init];
    vector_test = [[NSClassFromString(@"vector_operand") alloc] init];
    vector1 = [[NSClassFromString(@"vector_operand") alloc] init];
```

-continued

```
vector2 = [[NSClassFromString(@"vector_operand") alloc] init];
used_d = [target_square distance_to_POV:tool_POV];
do_draw_this = YES;
drawing_dummy = [NSBezierPath bezierPath];
        used_d = [target_square distance_to_POV:tool_POV];
        do_draw_this = YES;
        {p1 copy_from:[[[target_square get_corner_UL] get_normal]
                get_rectangular_coords] up_to:3]; //make_copy];
        p2 = [[[target_square get_corner_UR] get_normal]
                get_rectangular_coords];// make_copy];
                p3 = [[[target_square get_corner_LL] get_normal]
                        get_rectangular_coords];// make_copy];
                        p4 = [[[target_square get_corner_LR] get_normal]
                                get_rectangular_coords];// make_copy];
        [p1 alter_by_displacement:p2];
        [p1 alter_by_displacement:p3];
        [p1 alter_by_displacement:p4];
        [p1 alter_by_rotation:compass_rot];
        [vector_test set_rectangular_x:[p1 get_nth_value:1] y:[p1
                get_nth_value:2] z:[p1 get_nth_value:3]];
        do_draw_this = [vector_test normalize];
         shading = fabs([neg_normal
                cosine_of_angle_between:vector_test]);
        temp_usage = ([target_square get_horizontal_low] +
                [target_square get_horizontal_high])/2.0;
        [color_valuation set_nth_value:1 to:temp_usage];
        temp_usage = ([ target_square get_vertical_low] +
                [target_square get_vertical_high])/2.0;
        [color_valuation set_nth_value:2 to:temp_usage];
                shaded_color = [coloring
                        get_color_at:color_valuation
                        shaded_by:shading];
                target_surface1 = [target_square get_corner_UL];
                target_surface2 = [target_square get_corner_UR];
                [point_dummy copy_from:[target_surface1 get_location]
                        up_to:3];
        [point_dummy times:sf];
        [point_dummy alter_by_compass:shifting_compass];
        used_d = [point_dummy distance_to_POV:tool_POV];
        aPoint = [point_dummy projection_to_POV:tool_POV];
        if ((aPoint.x < -100000.0) || (aPoint.y < -10000))
                do_draw_this = NO;
        aPoint.x = aPoint.x + base_point.x;
        aPoint.y = aPoint.y + base_point.y;
            aPoint.x = flip_scaling * base_point.x + scaling *
                    aPoint.x;
            aPoint.y = flip_scaling * base_point.y + scaling *
                    aPoint.y;
        [drawing_dummy moveToPoint:aPoint];
        [old_point_dummy copy_from:point_dummy up_to:3];
        [point_dummy copy_from:[target_surface2 get_location]
                up_to:3];
            [point_dummy times:sf];
        [point_dummy alter_by_compass:shifting_compass];
        temp_d = [point_dummy distance_to_POV:tool_POV];
        if (temp_d < used_d)
                used_d = temp_d;
        oldAPoint = aPoint;
        aPoint = [point_dummy projection_to_POV:tool_POV];
        if ((aPoint.x < -100000.0) || (aPoint.y < -10000))
                do_draw_this = NO;
        aPoint.x = aPoint.x + base_point.x;
        aPoint.y = aPoint.y + base_point.y;
            aPoint.x = flip_scaling * base_point.x + scaling *
                    aPoint.x;
            aPoint.y = flip_scaling * base_point.y + scaling *
                    aPoint.y;
        if ((fabs(oldAPoint.x - aPoint.x) < base_res) &&
                (fabs(oldAPoint.y - aPoint.y) < base_res))
                [drawing_dummy lineToPoint:aPoint];
        else
        {
                [vector1 copy_from_vector:[target_surface1
                        get_tangent_vector:1]];
                [vector2 copy_from_vector:[target_surface2
                        get_tangent_vector:1]];
                [vector1 old_rotate_by:compass_rot];
                [vector2 old_rotate_by:compass_rot];
                controlPoint1 = [tool_POV
                        control_point_for_vector:vector1];
```

```
            controlPoint2 = [tool_POV
                control_point_for_vector:vector2];
            controlPoint1.x = oldAPoint.x + controlPoint1.x;
            controlPoint1.y = oldAPoint.y + controlPoint1.y;
                controlPoint1.x = flip_scaling * oldAPoint.x +
                    scaling * controlPoint1.x;
                controlPoint1.y = flip_scaling * oldAPoint.y +
                    scaling * controlPoint1.y;
            controlPoint2.x = aPoint.x + controlPoint2.x;
            controlPoint2.y = aPoint.y + controlPoint2.y;
                controlPoint2.x = flip_scaling * aPoint.x +
                    scaling * controlPoint2.x;
                controlPoint2.y = flip_scaling * aPoint.y +
                    scaling * controlPoint2.y;
            [drawing_dummy curveToPoint:aPoint
                controlPoint1:controlPoint1
                controlPoint2:controlPoint2];
        }
        target_surface1 = target_surface2;
        target_surface2 = [target_square get_corner_LR];
    [old_Point_dummy copy_from:point_dummy up_to:3];
[point_dummy copy_from:[target_surface2 get_location]
        up_to:3];
    [point_dummy times:sf];
    [point_dummy alter_by_compass:shifting_compass];
    temp_d = [point_dummy distance_to_POV:tool_POV];
    if (temp_d < used_d)
        used_d = temp_d;
    oldAPoint = aPoint;
        aPoint = [point_dummy
            projection_to_POV:tool_POV];
    if ((aPoint.x < -100000.0) || (aPoint.y < -10000))
        do_draw_this = NO;
    aPoint.x = aPoint.x + base_point.x;
    aPoint.y = aPoint.y + base_point.y;
        aPoint.x = flip_scaling * base_point.x + scaling *
            aPoint.x;
        aPoint.y = flip_scaling * base_point.y + scaling *
            aPoint.y;
    if ((fabs(oldAPoint.x - aPoint.x) < base_res) &&
        (fabs(oldAPoint.y - aPoint.y) < base_res))
        [drawing_dummy lineToPoint:aPoint];
    else
    {
        [vector1 copy_from_vector:[target_surface1
            get_tangent_vector:2]];
        [vector2 copy_from_vector:[target_surface2
            get_tangent_vector:2]];
        [vector1 old_rotate_by:compass_rot];
        [vector2 old_rotate_by:compass_rot];
        controlPoint1 = [tool_POV
            control_point_for_vector:vector1];
        controlPoint2 = [tool_POV
            control_point_for_vector:vector2];
        controlPoint1.x = oldAPoint.x + controlPoint1.x;
        controlPoint1.y = oldAPoint.y + controlPoint1.y;
            controlPoint1.x = flip_scaling * oldAPoint.x +
                scaling * controlPoint1.x;
            controlPoint1.y = flip_scaling * oldAPoint.y +
                scaling * controlPoint1.y;
        controlPoint2.x = aPoint.x + controlPoint2.x;
        controlPoint2.y = aPoint.y + controlPoint2.y;
            controlPoint2.x = flip_scaling * aPoint.x +
                scaling * controlPoint2.x;
            controlPoint2.y = flip_scaling * aPoint.y +
                scaling * controlPoint2.y;
        [drawing_dummy curveToPoint:aPoint
            controlPoint1:controlPoint1
            controlPoint2:controlPoint2];
    }
    target_surface1 = target_surface2;
    target_surface2 = [target_square get_corner_LL];
    [old_point_dummy copy_from:point_dummy up_to:3];
    [point_dummy copy_from:[target_surface2 get_location]
        up_to:3];
    [point_dummy times:sf];
    [point_dummy alter_by_compass:shifting_compass];
    temp_d = [point_dummy distance_to_POV:tool_POV];
    if (temp_d < used_d)
        used_d = temp_d;
```

```
oldAPoint = aPoint;
aPoint = [point_dummy projection_to_POV:tool_POV];
if ((aPoint.x < -100000.0) || (aPoint.y < -10000))
        do_draw_this = NO;
    aPoint.x = aPoint.x + base_point.x;
aPoint.y = aPoint.y + base_point.y;
    aPoint.x = flip_scaling * base_point.x + scaling *
            aPoint.x;
    aPoint.y = flip_scaling * base_point.y + scaling *
            aPoint.y;
if ((fabs(oldAPoint.x - aPoint.x) < base_res) &&
        (fabs(oldAPoint.y - aPoint.y) < base_res))
        [drawing_dummy lineToPoint:aPoint];
else
{
        [vector1 copy_from_vector:[target_surface1
            get_tangent_vector:1]];
        [vector2 copy_from_vector:[target_surface2
            get_tangent_vector:1]];
        [vector1 old_rotate_by:compass_rot];
        [vector2 old_rotate_by:compass_rot];
    controlPoint1 = [tool_POV
            control_point_for_vector:vector1];
    controlPoint2 = [tool_POV
            control_point_for_vector:vector2];
    controlPoint1.x = oldApoint.x + controlPoint1.x;
    controlPoint1.y = oldAPoint.y + controlPoint1.y;
        controlPoint1.x = flip_scaling * oldAPoint.x +
            scaling * controlPoint1.x;
        controlPoint1.y = flip_scaling * oldAPoint.y +
            scaling * controlPoint1.y;
    controlPoint2.x = aPoint.x + controlPoint2.x;
    controlPoint2.y = aPoint.y + controlPoint2.y;
        controlPoint2.x = flip_scaling * aPoint.x +
            scaling * controlPoint2.x;
        controlPoint2.y = flip_scaling * aPoint.y +
            scaling * controlPoint2.y;
        [drawing_dummy curveToPoint:aPoint
            controlPoint1:controlPoint1
            controlPoint2:controlPoint2];
            }
target_surface1 = target_surface2;
target_surface2 = [target_square get_corner_UL];
[old_point_dummy copy_from:point_dummy up_to:3];
[point_dummy copy_from:[target_surface2 get_location]
        up_to:3];
    [point_dummy times:sf];
[point_dummy alter_by_compass:shifting_compass];
temp_d = [point_dummy distance_to_POV:tool_POV];
if (temp_d < used_d)
        used_d = temp_d;
oldAPoint = aPoint;
aPoint = [point_dummy projection_to_POV:tool_POV];
if ((aPoint.x < -100000.0) || (aPoint.y < -10000))
        do_draw_this = NO;
aPoint.x = aPoint.x + base_point.x;
aPoint.y = aPoint.y + base_point.y;
    aPoint.x = flip_scaling * base_point.x + scaling *
            aPoint.x;
    aPoint.y = flip_scaling * base_point.y + scaling *
            aPoint.y;
if ((fabs(oldAPoint.x - aPoint.x) < base_res) &&
        (fabs(oldAPoint.y - aPoint.y) < base_res))
        [drawing_dummy lineToPoint:aPoint];
else
{
        [vector1 copy_from_vector:[target_surface1
            get_tangent_vector:2]];
        [vector2 copy_from_vector:[target_surface2
            get_tangent_vector:2]];
        [vector1 old_rotate_by:compass_rot];
        [vector2 old_rotate_by:compass_rot];
    controlPoint1 = [tool_POV
            control_point_for_vector:vector1];
    controlPoint2 = [tool_POV
            control_point_for_vector:vector2];
        controlPoint1.x = oldAPoint.x + controlPoint1.x;
        controlPoint1.y = oldAPoint.y + controlPoint1.y;
        controlPoint1.x = flip_scaling * oldAPoint.x +
            scaling * controlPoint1.x;
```

-continued

```
            controlPoint1.y = flip_scaling * oldAPoint.y +
                scaling * controlPoint1.y;
            controlPoint2.x = aPoint.x + controlPoint2.x;
            controlPoint2.y = aPoint.y + controlPoint2.y;
            controlPoint2.x = flip_scaling * aPoint.x + scaling
                * controlPoint2.x;
            controlPoint2.y = flip_scaling * aPoint.y +
                scaling * controlPoint2.y;
            [drawing_dummy curveToPoint:aPoint
                controlPoint1:controlPoint1
                controlPoint2:controlPoint2];
            }
        if (do_draw_this)
            {[self set_used_occupation_rect:[target_square
                minimal_occupation_rect_for_POV:tool_POV]];
                [self set_rect_created:YES];
                [self set_used_opacity:[shaded_color
                    alphaComponent]];
                [this_viewer
                    generate_triplet_from_path:drawing_dummy
                    color:shaded_color distance:used_d fill:YES];
                if (drawn_list != nil)
                {
            if (drawn_space == nil)
                {drawn_space = [[TwoD_dataspace alloc] init];
                [drawn_space
                    set_used_occupation_rect:used_occupation_rect];
                }
                else
                    drawn_space = [drawn_space
                        get_full_dataspace_adding_rect_if_new_lowest:used_occupation_rect];
                [drawn_list set_base_operand:drawn_space];
            }
            }
        }
    }
}
}
```

In a further contemplated embodiment of the invention the drawing routines are embedded into other software employing the drawing processes of this invention in alternative applications, such as video games or web page plug-in animations.

Figure 8:
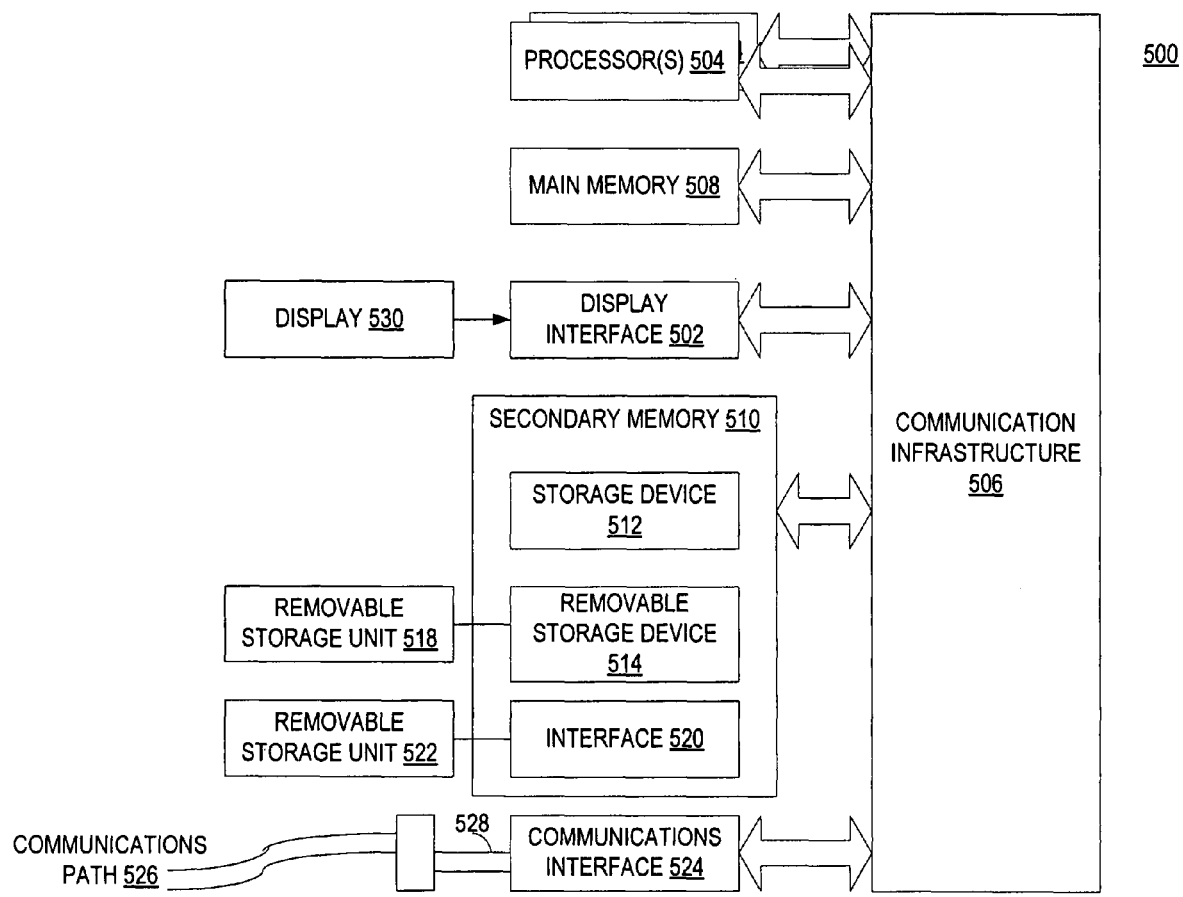
FIG. 8 is schematic representation of the system implemented on a computer.
Figure 9:
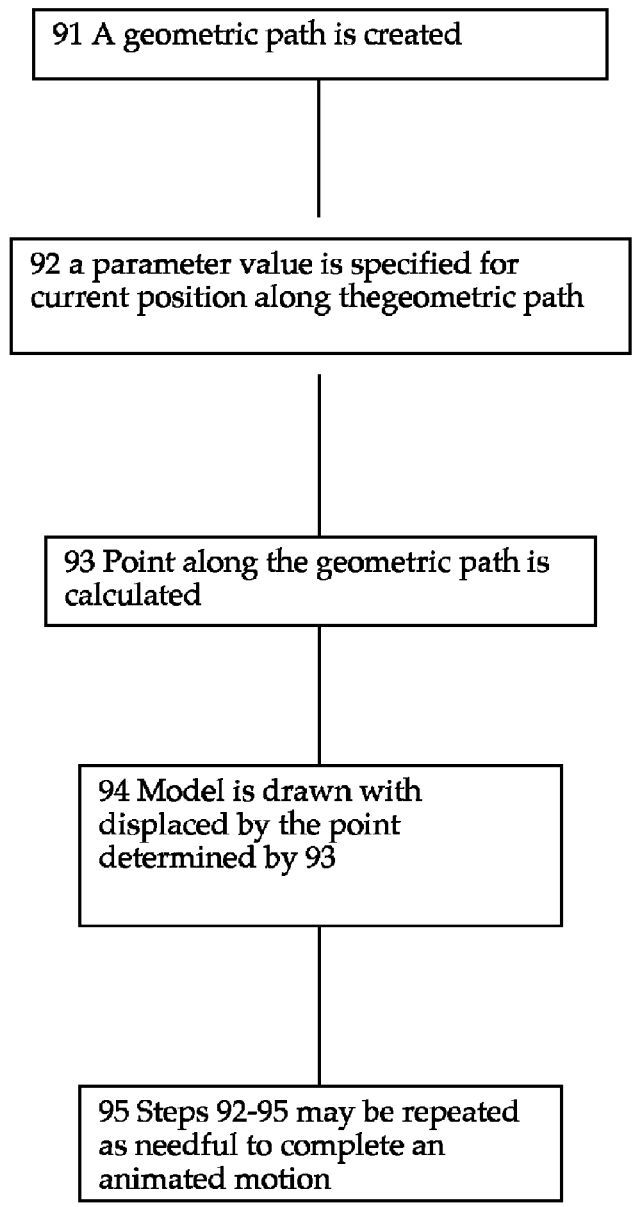
FIG. 9 is a flowchart for executing the motion of a model along a geometric path.

FIG. 8 depicts an exemplary computer system that may be used in implementing an exemplary embodiment of the present invention. Specifically, FIG. 8 depicts an exemplary embodiment of a computer system 600 that may be used in computing devices such as, e.g., but not limited to, client or server devices including devices 116a, 116b, 101, 108, 208, etc. according to an exemplary embodiment of the present invention. The present invention (or any part(s) or function(s) thereof) may be implemented using hardware, software, firmware, or a combination thereof and may be implemented in one or more computer systems or other processing systems. In fact, in one exemplary embodiment, the invention may be directed toward one or more computer systems capable of carrying out the functionality described herein. An example of a computer system 600 is shown in FIG. 8, depicting an exemplary embodiment of a block diagram of an exemplary computer system useful for implementing the present invention. Specifically, FIG. 8 illustrates an example computer 600, which in an exemplary embodiment may be, e.g., (but not limited to) a personal computer (PC) system running an operating system. The invention may be implemented on any appropriate computer system running any appropriate operating system. Other components of the invention, such as, e.g., (but not limited to) a computing device, a communications device, a telephone, a personal digital assistant (PDA), a personal computer (PC), a handheld PC, client workstations, thin clients, thick clients, proxy servers, network communication servers, remote access devices, client computers, server computers, routers, web servers, data, media, audio, video, telephony or streaming technology servers, etc., may also be implemented using a computer such as that shown in FIG. 8.

The computer system 600 may include one or more processors, such as, e.g., but not limited to, processor(s) 604. The processor(s) 604 may be connected to a communication infrastructure 602 (e.g., but not limited to, a communications bus, cross-over bar, or network, etc.). Various exemplary software embodiments may be described in terms of this exemplary computer system. After reading this description, it will become apparent to a person skilled in the relevant art(s) how to implement the invention using other computer systems and/or architectures.

Computer system 600 may include a display interface 602 that may forward, e.g., but not limited to, graphics, text, and other data, etc., from the communication infrastructure 602 (or from a frame buffer, etc., not shown) for display on the display unit 620.

The computer system 600 may also include, e.g., but may not be limited to, a main memory 606, random access memory (RAM), and a secondary memory 608 etc. The secondary memory 608 may include, for example, (but not limited to) a hard disk drive 610 and/or a removable storage drive 612, representing a floppy diskette drive, a magnetic tape drive, an optical disk drive, a compact disk drive CD-ROM, etc. The removable storage drive 612 may, e.g., but not limited to, read from and/or write to a removable storage unit 614 in a well known manner. Removable storage unit 614, also called a program storage device or a computer program product, may represent, e.g., but not limited to, a floppy disk, magnetic tape, optical disk, compact disk, etc. which may be read from and written to by removable storage drive 614. As will be appreciated, the removable storage unit 614 may include a computer usable storage medium having stored therein computer software and/or data.

In alternative exemplary embodiments, secondary memory 608 may include other similar devices for allowing computer programs or other instructions to be loaded into computer system 600. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, and other removable storage units 614 and interfaces, which may allow software and data to be transferred from the removable storage unit 614 to computer system 600.

Computer 600 may also include an input device such as, e.g., (but not limited to) a mouse 616 or other pointing device such as a digitizer, and a keyboard 618 or other data entry device (none of which are labeled).

Computer 600 may also include output devices, such as, e.g., (but not limited to) display 620. Computer 600 may include input/output (I/O) devices such as, e.g., (but not limited to) communications interface 624. These devices may include, e.g., but not limited to, a modems. Communications interface 624 may allow software and data to be transferred between computer system 600 and external devices.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. An apparatus may be specially constructed for the desired purposes, or it may comprise a general purpose device selectively activated or reconfigured by a program stored in the device.

In yet another contemplated embodiment of the invention, a graphics card with the invention's drawing routines is provided. The software code required for this embodiment may be a abbreviated version of the code shown above. This efficient embodiment frees the CPU of the computer from the task of drawing.

While the invention has been described in terms of preferred embodiments, those skilled in the art will recognize that the invention can be practiced with modification within the spirit and scope of the appended claims.

The invention claimed is:

1. A method for creating an object model data set of a predetermined surface having a three dimensional shape, said model comprised of a plurality of patches, each of said patches comprised of at least two points associated with a predetermined mathematical function corresponding to said surface, where each point has a corresponding at least one coordinate whose location is calculated using a computer in dependence on the predetermined mathematical function, at least one tangent vector and at least one curvature value, comprising the steps of:

for each of the plurality of patches, calculating using the computer for each of the at least two points associated with said corresponding predetermined mathematical function, at least one tangent vector by means of calculating a first partial derivative of said corresponding predetermined mathematical function and at least one curvature value by means of calculating a second partial derivative of said corresponding predetermined mathematical function by retrieving from a storage device the numerical values representing the coordinates of said at least two points and using as input into said computer said numerical values representing the coordinates, wherein the plurality of patches resemble at least part of said surface of said model and the entire surface of said model represented by only a single mathematical function said single mathematical function being the said corresponding predetermined mathematical function, and storing on a data storage device said plurality of calculated numerical values representing said corresponding at least one tangent vectors and at least one curvature values.

2. The method recited in claim 1 further comprising projecting said object model data set onto a display screen.

3. The method of claim 1 further comprising using at least one animation drawing routine using said object model data set.

4. The method recited in claim 1 wherein optical characteristics of the three dimensional shape is created and stored as mathematical functions together with numerical data that can be used at any desired step in the method.

5. The method recited in claim 3 further comprising implementing a drawing routine to create data that spatially organizes said object model data set using position data or point data or both whereby said object model can then be moved with respect to a view point as an individual entity or as an individual element of a plurality of entities on a display screen.

6. The method recited in claim 3 in which said at least one drawing routine is used together with stored mathematical functions and stored numerical data, said stored mathematical functions and stored numerical data relating to the shape or position of said model with respect to a viewpoint, in order to make changes in the shape or position of the model or both.

7. The method recited in claim 6 in which said at least one drawing routine is used together with said stored mathematical functions and said stored numerical data in order to make changes in shape or position or a combination thereof.

8. The method recited in claim 6 in which said at least one drawing routine is used together with said stored mathematical functions and said stored numerical data in order to make changes in shape or position or optical characteristics or a combination thereof.

9. The method recited in claim 5 in which said drawing routine is used to create at least one geometrical path and to move the created three dimensional model along said paths.

10. The method in claim 6 in which said at least one drawing routine is used to create at least one geometrical path and to move the created three dimensional shape along them.

11. The method in claim 7 in which said at least one drawing routine is used to create at least one geometrical path and to move the created three dimensional shape along them.

12. The method in claim 8 in which said at least one drawing routine is used to create at least one geometrical path and to move the created three dimensional shape along them.

13. A system for creating three dimensional animated drawings comprising a central processing unit, input means, and display means and software, said software comprising the instructions to implement any of the methods recited in claims 1 through 8 and 10 through 12.

14. A method for calculating on a computer an object model data set of a predetermined surface having a three dimensional shape comprising the steps of:

calculating on a computer using a single predetermined mathematical function corresponding to said predetermined surface a plurality of tangent vectors calculated by means of calculating a partial derivative of the predetermined mathematical function at a plurality of pairs of two points on the predetermined mathematical function corresponding to the tangent vectors, the location of the points being calculated on the computer using the predetermined mathematical function and at least one curvature value calculated by means of calculating a plurality of second partial derivatives of the predetermined mathematical function at the same plurality of pairs of points on the corresponding predetermined mathematical function, wherein the plurality of tangent vectors and plurality of curvature values define a plurality of patches that resemble at least part of said surface and the entire surface of said object model is represented by only the single predetermined mathematical function.

15. The method recited in claim 14 further comprising: using at least one animation drawing routine using said object model data set.

16. The method recited in claim 14 further comprising: projecting said object model data set onto a display screen.

17. The method in claim 15 in which said at least one drawing routine is used to create geometrical paths and move modeled objects along them.

18. A method for calculating an object model data set of an object having a three dimensional shape comprising the steps of transmitting a digital data file comprised of digital data that when executed as a computer program running on a computer, causes said computer to execute any of the methods of claims 1-8 and 9-12 and 14-17.

19. The method of claim 1 further comprising: designating one region of the object a first sub-patch and a second region of the object as a second sub-patch, and then applying the method steps recursively to the first and second sub-patches.

20. The method of claim 1 where each point has two tangent vectors and one curvature value.

21. The method of claim 20 where each patch is represented by four points.

22. The method of claim 21 where each of said four points is substantially at a corner of the patch.

23. The method of claim 20 where at least one patch is separated into a plurality of sub-patches and the method applied to each sub-patch.

24. A system for creating three dimensional animated drawings comprising a central processing unit, input means, and display means and software, said software comprising the instructions to implement any of the methods recited in claims 14 through 17 or 19 through 22.

25. A method for calculating an object model data set of an object having a three dimensional shape comprising the steps of transmitting a digital data file comprised of digital data that when executed as a computer program running on a computer, causes said computer to execute any of the methods of claims 19-23.

26. The method of claim 1 where the at least two points occupy positions on the edge of the patch.

27. The method of claim 1 where the at least two points on the mathematical function occupy positions on the edge of the patch.

28. The method of claim 1 further comprising:

for at least one of the plurality of patches, said patch having four edges and each edge having a center point, determining the center point of the patch and the center points of the edges of the patch;

determining four sub-patches using the center points of the edges of the patch;

determining further sub-patches of the determined sub-patches using the two determination steps.

29. The method of claim 1 wherein the mathematical function is a differential geometric function.

30. The method of claim 28 where the location of the center point is calculated using the predetermined mathematical function.

31. The method of claim 28 where the mathematical function is a differential geometric function.

* * * * *

UNITED STATES PATENT AND TRADEMARK OFFICE
CERTIFICATE OF CORRECTION

| | | |
|---|---|---|
| PATENT NO. | : 8,243,066 B2 | Page 1 of 1 |
| APPLICATION NO. | : 11/636447 | |
| DATED | : August 14, 2012 | |
| INVENTOR(S) | : Richard Garfinkle | |

It is certified that error appears in the above-identified patent and that said Letters Patent is hereby corrected as shown below:

Column 2, Line 54: change "objects" to --object--
Column 3, Line 14: add the word --to-- between have and be
Column 21, Line 8: add the word --a-- before computer
Column 21, Line 17: add the word --a-- before computer
Column 21, Line 26: delete the word "a" before modems
Column 21, Line 58: change "a" to --an--
Column 23, Line 11, Claim 13: change "claims 1 through 8 and 10 through 12." to --claims 1 through 12.--

Signed and Sealed this

Twentieth Day of November, 2012

David J. Kappos
*Director of the United States Patent and Trademark Office*